(12) United States Patent  (10) Patent No.: US 8,941,537 B2
Ben-Moshe et al.  (45) Date of Patent: Jan. 27, 2015

(54) METHODS FOR IDENTIFYING WHETHER OR NOT A SATELLITE HAS A LINE OF SIGHT

(71) Applicant: Ariel-University Research and Development Company, Ltd., Ariel (IL)

(72) Inventors: Boaz Ben-Moshe, Herzliya (IL); Nir Shvalb, Nesher (IL)

(73) Assignee: Ariel-University Research and Development Company Ltd., Ariel (IL)

( * ) Notice: Subject to any disclaimer, the term of this patent is extended or adjusted under 35 U.S.C. 154(b) by 0 days.

(21) Appl. No.: 14/360,244

(22) PCT Filed: Jan. 3, 2013

(86) PCT No.: PCT/IB2013/050063
§ 371 (c)(1),
(2) Date: May 22, 2014

(87) PCT Pub. No.: WO2013/102870
PCT Pub. Date: Jul. 11, 2013

(65) Prior Publication Data
US 2014/0333476 A1  Nov. 13, 2014

Related U.S. Application Data

(60) Provisional application No. 61/582,839, filed on Jan. 4, 2012.

(51) Int. Cl.
*G01S 19/22* (2010.01)
(52) U.S. Cl.
CPC ..................................... *G01S 19/22* (2013.01)

USPC ....................................................... 342/357.61
(58) Field of Classification Search
USPC .............. 342/357.61, 357.39, 357.35, 357.78
See application file for complete search history.

(56) References Cited

U.S. PATENT DOCUMENTS

| 6,707,422 | B2 | 3/2004 | Sheynblat et al. |
| 6,937,865 | B1 * | 8/2005 | Bloebaum et al. ......... 455/456.1 |
| 6,973,119 | B2 | 12/2005 | Yotsumoto |
| 7,577,445 | B2 | 8/2009 | Guvenc et al. |
| 2003/0087604 | A1 | 5/2003 | Stein et al. |

(Continued)

FOREIGN PATENT DOCUMENTS

| TW | 444130 | 7/2001 |
| WO | 2008/148794 | 12/2008 |
| WO | 2010/051416 | 5/2010 |

OTHER PUBLICATIONS

Kontkanen et al., "Topics in Probabilistic Location Estimation in Wireless Networks," Complex Systems Computation Group, Helsinki Institute for Information Technology, University of Helsinki & Helsinki University of Technology, P.O.Box 9800, 02015 Hut, Finland.

(Continued)

*Primary Examiner* — Harry Liu (57) ABSTRACT

The invention, in some embodiments, relates to the field of global navigation satellite systems, and more particularly to the field of methods and devices for identifying whether a satellite in a global navigation satellite system has a line of sight to a specific global navigation satellite system receiver (LOS satellite) or does not have a line of sight to the global navigation satellite system receiver (NLOS satellite).

20 Claims, 8 Drawing Sheets

(56) References Cited

U.S. PATENT DOCUMENTS

| | | | |
|---|---|---|---|
| 2005/0124368 A1 | 6/2005 | Diao et al. | |
| 2008/0129598 A1 | 6/2008 | Godefroy et al. | |
| 2008/0224924 A1* | 9/2008 | Lethbridge | 342/357.1 |
| 2009/0179796 A1 | 7/2009 | Chen | |
| 2010/0079332 A1* | 4/2010 | Garin | 342/357.01 |
| 2010/0194633 A1* | 8/2010 | Yamagata | 342/357.05 |
| 2013/0285849 A1 | 10/2013 | Ben-Moshe et al. | |

OTHER PUBLICATIONS

Prost et al., "City Walk," GPS World, Aug. 1, 2008.

Ben-Moshe et al., "Improving Accuracy of GNSS Devices in Urban Canyons," 23d Canadian Conference on Computational Geometry, 2011, Toronto ON, Aug. 10-12, 2011.

Groves, "Shadow Matching: A New GNSS Positioning Technique for Urban Canyons," The Journal of Navigation (2011), 64, 417-430. f The Royal Institute of Navigation doi:10.1017/S0373463311000087, pp. 418-430.

Groves et al., "Shadow Matching Improved GNSS Accuracy in Urban Canyons," GPS World, Feb. 2012. pp. 14-18.

International Search Report and Written Opinion for application PCT/IB2013/050063 dated Jan. 11, 2013.

* cited by examiner

METHODS FOR IDENTIFYING WHETHER OR NOT A SATELLITE HAS A LINE OF SIGHT

RELATED APPLICATION

The present application gains priority from U.S. Provisional Patent Application No. 61/582,389 filed 4 Jan. 2012, which is included by reference as if fully set-forth herein.

FIELD AND BACKGROUND OF THE INVENTION

The invention, in some embodiments, relates to the field of global navigation satellite systems, and more particularly to the field of methods and devices for identifying whether a satellite in a global navigation satellite system has a line of sight to a specific global navigation satellite systems receiver (LOS satellite) or does not have a line of sight to the global navigation satellite systems receiver (NLOS satellite).

Global Navigation Satellite Systems (GNSS) provide autonomous geo-spatial positioning, typically including global coverage. A global navigation satellite system allows an electronic receiver to determine its own position, namely longitude, latitude, and altitude, to within a few meters, using ephemeris data and time signals transmitted by radio from one or more satellites.

A GNSS receiver approximates its position by interpolating the signal from each navigation satellite, and specifically the precise coordinates of the satellite contained in the ephemeris data and the time stamps received from the satellite, into a pseudorange, indicating a region to which the signal from the satellite could travel in the specified time duration.

Using the location and pseudorange of at least four satellites, the GNSS receiver computes its location by intersecting the pseudoranges to obtain a user position. The position is generally provided to a user as a position region, for example a position circle having a calculated center point indicating the most likely position of the receiver, and a radius that indicates an estimated error. Mathematically, four pseudoranges are sufficient to determine the position of the receiver with a reasonable error.

Disregarding topography and terrestrial objects on the Earth's surface, most global navigation satellite systems, such as GPS, GLONASS, and Galileo, have satellite coverage that ensures that a receiver on Earth has simultaneous lines of sight (LOS) to at least four satellites and can therefore accurately determine its position.

When the line of sight to a number of satellites is blocked, the accuracy of the calculated position may decrease. For example, in many cities, tall buildings or other obstacles form an urban canyon where sky visibility is greatly limited. It is very common for a GNSS device operating in an area of this sort to be surrounded by obstacles which block the line of sight to most, if not all, otherwise-visible GNSS satellites.

As mentioned above, at least four sufficiently strong signals from four line-of-sight satellites are required for accurate position determination. Therefore, knowing whether or not a specific GNSS satellite has a line of sight to a GNSS receiver may have a great effect on the accuracy of the position calculated by the GNSS receiver. Several uses for identification of GNSS satellites as LOS satellites or NLOS satellites are known, such as those described in U.S. Patent Application Publication No. 2010/0079332 and in PCT patent application PCT/IB2011/055899 filed 22 Dec. 2011 and published as WO 2012/085876 of an Inventor.

SUMMARY OF THE INVENTION

Some embodiments of the invention relate to methods for identifying whether a GNSS satellite has line of sight and is thus an LOS satellite or does not have line of sight and is thus an NLOS satellite with respect to a given GNSS receiver.

In accordance with an aspect of some embodiments of the teachings herein, there is provided a method for classifying whether or not a GNSS satellite has a line of sight to a GNSS receiver, the method comprising:

at least two timestamps, at a GNSS receiver, receiving signals from a GNSS satellite;

using the received signals and ephemeris data of the GNSS satellite, computing a relative direction vector indicating a direction of motion of the GNSS receiver relative to the GNSS satellite;

computing a Doppler vector indicating the direction of motion of the GNSS receiver relative to the GNSS satellite, based on Doppler shifts computed for each of the received signals;

comparing the relative direction vector and the Doppler vector; and using the comparison, classifying whether:

the GNSS satellite is an LOS satellite having a line of sight to the GNSS receiver; or the GNSS satellite is an NLOS satellite, not having a line of sight to the GNSS receiver.

In some embodiments, the GNSS satellite is located above the horizon with respect to the GNSS receiver.

In some embodiments, the comparing comprises comparing a direction of the relative direction vector and a direction of the Doppler vector. In some embodiments, the classifying comprises classifying the GNSS satellite as an LOS satellite if the direction of the relative direction vector corresponds to the direction of the Doppler vector, and the classifying comprises classifying the GNSS satellite as an NLOS satellite if the direction of the relative direction vector does not correspond to the direction of the Doppler vector.

In some embodiments, more than two signals are received from the GNSS satellite. In some embodiments, the at least two time stamps are less than 30 seconds apart.

In some embodiments, the method also comprises extracting the ephemeris data from a database. In some such embodiments, the extracting comprises extracting the ephemeris data from the database at an extracting rate which is typically frequent, for example more frequently than every 30 seconds.

In some embodiments, for example if the timestamps are more than 30 seconds apart, the method also comprises obtaining ephemeris data of the GNSS satellite at each of the at least two timestamps, using the ephemeris data taken at each of the at least two timestamps to compute a satellite vector indicative of a direction of motion of the GNSS satellite, where the comparing comprises comparing the relative direction vector and the Doppler vector while taking into consideration the direction of motion of the GNSS satellite as indicated by the satellite vector.

In some embodiments, the computing the relative direction vector comprises computing a position of the GNSS receiver at the at least two timestamps.

In some embodiments, at least one of the computing a relative direction vector, the computing a Doppler vector, the comparing, and the classifying is carried out at a server remote from the GNSS receiver.

In some embodiments, at least one of the computing a relative direction vector, the computing a Doppler vector, the comparing, and the classifying is carried out at the GNSS receiver.

In accordance with an aspect of some embodiments of the teachings herein, there is also provided a device for classifying whether or not a GNSS satellite has a line of sight to a GNSS receiver, comprising:

a receiver configured to receive data regarding signals from a GNSS satellite at at least two timestamps;

a relative motion computing module configured to use the received data and ephemeris data of the GNSS satellite, to compute a relative direction vector indicating a direction of motion of a mobile receiver relative to the GNSS satellite;

a Doppler computing module configured to compute a Doppler vector indicating the direction of motion of the mobile receiver relative to the GNSS satellite, based on Doppler shifts computed for each of the signals for which data was received; and a satellite classification module configured to compare the relative direction vector and the Doppler vector and to use the comparison to classify whether:
the GNSS satellite is an LOS satellite having a line of sight to the GNSS receiver; or
the GNSS satellite is an NLOS satellite, not having a line of sight to the GNSS receiver.

In some embodiments, the satellite classification module is configured to compare a direction of the relative direction vector and a direction of the Doppler vector. In some embodiments, the satellite classification module is configured to classify the GNSS satellite as an LOS satellite if the direction of the relative direction vector corresponds to the direction of the Doppler vector, and to classify the GNSS satellite as an NLOS satellite if the direction of the relative direction vector does not correspond to the direction of the Doppler vector.

In some embodiments, the device also comprises a data extractor configured to extract the ephemeris data from a database at an extracting rate, typically frequent, for example more frequently than once in 30 seconds.

In some embodiments, the device also comprises a satellite vector computing module configured to obtain ephemeris data of the GNSS satellite at each of the at least two timestamps and use the obtained ephemeris data to compute a satellite vector indicative of a direction of motion of the GNSS satellite, wherein the satellite classification module is configured to compare the relative direction vector and the Doppler vector while taking into consideration the direction of motion of the GNSS satellite as indicated by the satellite vector.

In some embodiments, the relative motion computing module is configured to compute a position of the GNSS receiver at the at least two timestamps.

In some embodiments, the receiver and the mobile receiver comprises a GNSS receiver, and the data comprises signals from the GNSS satellite. In some such embodiments, at least one of the relative motion computing module, the Doppler computing module, and the satellite classification module is included in the GNSS receiver.

In some embodiments, at least one of the receiver, the relative motion computing module, the Doppler computing module, and the satellite classification module forms part of a server located remotely from the GNSS receiver. In some such embodiments, in which the receiver forms part of the remote server, the receiver is configured to receive the data from a GNSS receiver functionally associated therewith.

In accordance with an aspect of some embodiments of the teachings herein, there is also provided a method for classifying whether or not multiple GNSS satellites have a line of sight to a GNSS receiver, the method comprising:

receiving signals from a plurality of GNSS satellites;

for each satellite in the plurality of GNSS satellites, computing a pseudorange to the GNSS receiver based on at least one of the signals received from the satellite; and using the computed pseudoranges, classifying, for each satellite in the plurality of GNSS satellites, whether:
the satellite is an LOS satellite, having a line of sight to the GNSS receiver; or
the satellite is an NLOS satellite, not having a line of sight to the GNSS receiver.

In some embodiments, each satellite in the plurality of GNSS satellites is located above the horizon with respect to the GNSS receiver.

In some embodiments, the using of the computed pseudoranges comprises using the computed pseudoranges and ephemeris data of each of the plurality of GNSS satellites to define for each satellite in the plurality of GNSS satellites a pseudorange sphere. In some embodiments, the classifying comprises classifying a first group of satellites in the plurality of GNSS satellites, corresponding to a first group of pseudorange spheres which intersect with one another at a single point, as a single class of satellites. In some such embodiments, the classifying comprises classifying the first group of satellites as NLOS satellites if the single point defines a contradiction, and classifying the first group of satellites as LOS satellites if the single point does not define a contradiction, and if different ones of the GNSS satellites in the first group are located at different directions with respect to the GNSS receiver, and/or, that different ones of the GNSS satellites in the first group are located at different angles with respect to the GNSS receiver.

In some embodiments, the classifying comprises classifying a second group of the plurality of GNSS satellites, corresponding to a second group of pseudorange spheres which enclose the intersection at the single point, as NLOS satellites. In some embodiments, the classifying comprises classifying some of the plurality of GNSS satellites, corresponding to some of the pseudorange spheres for which there exists a contradiction, as NLOS satellites. In some such embodiments, the contradiction comprises at least one of: a pseudorange sphere indicating a receiver-location beneath the surface of the earth (e.g., underground or submerged underwater) or a pseudorange sphere indicating a receiver-location suspended above the surface of the earth (e.g., in the sky, or in outer-space).

In some embodiments, the receiving comprises receiving a signal from each of the plurality of GNSS satellites at at least two timestamps, the computing a pseudorange comprises, for each of the plurality of GNSS satellites, computing a pseudorange based on each of the at least two signals received from the satellite, and the using the computed pseudoranges comprise, for each of the plurality of GNSS satellites, comparing the pseudoranges corresponding to the at least two timestamps and identifying a sudden change in a magnitude of the pseudoranges between the at least two timestamps.

In some embodiments, the classifying comprises classifying the GNSS satellite as an LOS satellite at a first of the at least two timestamps and as an NLOS satellite at a second of the at least two timestamps if the length of the pseudoranges increased between the at least two timestamps. In some embodiments, the classifying comprises classifying the GNSS satellite as an NLOS satellite at a first of the at least two timestamps and as an LOS satellite at a second of the at least two timestamps if the magnitude of the pseudoranges decreased between the at least two timestamps.

In accordance with an aspect of some embodiments of the teachings herein, there is also provided a device for classifying whether or not multiple GNSS satellites have a line of sight to a GNSS receiver, comprising:
  a receiver configured to receive signals from a plurality of GNSS satellite;
  a pseudorange computing module configured, for each satellite of the plurality of GNSS satellites, to compute a pseudorange to a GNSS receiver based on at least one of the signal received from the satellite; and
  a satellite classifying module configured to use the computed pseudoranges to classify, for each satellite in the plurality of GNSS satellites, whether:
    the satellite is an LOS satellite, having a line of sight to the GNSS receiver; or
    the satellite is an NLOS satellite, not having a line of sight to the GNSS receiver.

In some embodiments, the satellite classifying module is configured to use the computed pseudoranges and ephemeris data of each of the plurality of GNSS satellites to define for each satellite in the plurality of GNSS satellites a pseudorange sphere.

In some embodiments, the satellite classifying module is configured to classify a first group of satellites in the plurality of GNSS satellites, corresponding to a first group of pseudorange spheres which intersect with one another at a single point, as a single class of satellites.

In some embodiments, the satellite classifying module is configured to classify the first group of satellites as NLOS satellites if the single point defines a contradiction and classify the first group of satellites as LOS satellites if the single point does not define a contradiction, and if different ones of the satellites in the first group are located at different directions and/or at different angles with respect to the GNSS receiver.

In some embodiments the satellite classifying module is configured to classify a second group of satellites in the plurality of GNSS satellites, corresponding to a second group of pseudorange spheres which enclose the intersection at the single point, as NLOS satellites.

In some embodiments, the satellite classifying module is configured to classify some of the plurality of GNSS satellites, corresponding to some of the pseudorange spheres for which there exists a contradiction, as NLOS satellites. In some such embodiments, the contradiction comprises at least one of: a pseudorange sphere indicating a receiver-location beneath the surface of the earth (e.g., underground or submerged underwater) or a pseudorange sphere indicating a receiver-location suspended above the surface of the earth (e.g., in the sky, or in outer-space).

In some embodiments, the GNSS receiver is configured to receive a signal from each of the plurality of GNSS satellites at at least two timestamps, the pseudorange computing module is configured, for each of the plurality of GNSS satellites, to compute a pseudorange based on each of the at least two signals received from the satellite, and the satellite classifying module is configured, for each of the plurality of GNSS satellites, to compare the pseudoranges corresponding to the at least two timestamps and to identify a sudden change in a magnitude of the pseudoranges between the at least two timestamps.

In some embodiments, the satellite classifying module is configured to classify the GNSS satellite as an LOS satellite at a first of the at least two timestamps and as an NLOS satellite at a second of the at least two timestamps if the length of the pseudoranges increased between the at least two timestamps. In some embodiments, the satellite classifying module is configured to classify the GNSS satellite as an NLOS satellite at a first of the at least two timestamps and as an LOS satellite at a second of the at least two timestamps if the magnitude of the pseudoranges decreased between the at least two timestamps.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof.

As used herein, the indefinite articles "a" and "an" mean "at least one" or "one or more" unless the context clearly dictates otherwise.

As used herein, when a numerical value is preceded by the term "about", the term "about" is intended to indicate +/−10%.

Embodiments of methods and/or devices of the invention may involve performing or completing selected tasks manually, automatically, or a combination thereof. Some embodiments of the invention are implemented with the use of components that comprise hardware, software, firmware or combinations thereof. In some embodiments, some components are general-purpose components such as general purpose computers or oscilloscopes. In some embodiments, some components are dedicated or custom components such as circuits, integrated circuits or software.

For example, in some embodiments, some of an embodiment is implemented as a plurality of software instructions executed by a data processor, for example which is part of a general-purpose or custom computer. In some embodiments, the data processor or computer comprises volatile memory for storing instructions and/or data and/or a non-volatile storage, for example, a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures.

DESCRIPTION OF SOME EMBODIMENTS OF THE INVENTION

The invention, in some embodiments, relates to the field of global navigation satellite systems, and more particularly to the field of methods and devices for identifying whether a GNSS satellite is an LOS satellite or an NLOS satellite with respect to a specific GNSS receiver.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the Examples. The invention can be implemented with other embodiments and can be practiced or carried out in various ways. It is also understood that the phraseology and terminology employed herein is for descriptive purpose and should not be regarded as limiting.

As discussed in the introduction, blocked line of sight between a receiver of a global navigation satellite system and one or more GNSS satellites, due to terrestrial objects, for example city buildings and other objects in an urban area, may be a source of errors in position calculation for GNSS receivers.

Figure 1:
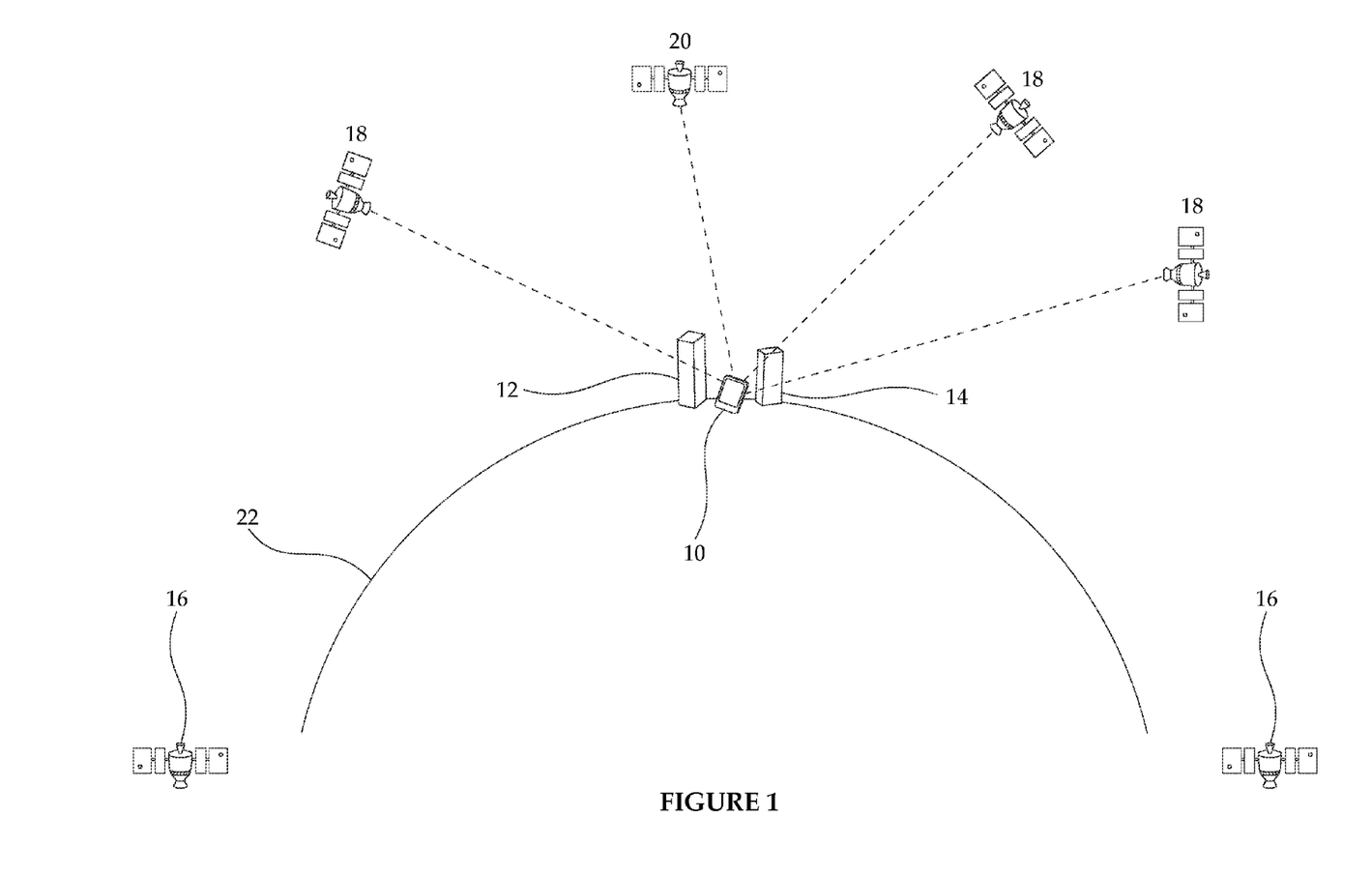
FIG. 1 is a pictorial illustration of an embodiment of a device for identifying whether a GNSS satellite is an LOS satellite or an NLOS satellite with respect to a GNSS receiver according to an embodiment of the teachings herein.

Reference is now made to FIG. 1, which is a pictorial illustration of a device for identifying whether a GNSS satellite is an LOS satellite or an NLOS satellite with respect to a GNSS receiver according to an embodiment of the teachings herein. As seen in FIG. 1, a GNSS receiver 10 is located in an urban area which includes several tall buildings, indicated by reference numerals 12 and 14. A plurality of GNSS satellites, indicated by reference numerals 16, 18, and 20, are seen orbiting the Earth 22.

As seen in FIG. 1, the satellites 16 are below the horizon with respect to receiver 10, and therefore invisible to receiver 10. Receiver 10 may be able to receive signals from satellites 18 and 20, which are above the horizon, and therefore in a visible range, with respect to the receiver 10. That being said, each satellite 18 and 20 in the visible range can be classified as a line of sight (LOS) satellite or a non line of sight (NLOS) satellite, depending on whether receiver 10 has an unblocked line of sight to that satellite.

As seen in FIG. 1, satellite 20 is an LOS satellite, having an unblocked line of sight to receiver 10. Satellites 18 are NLOS satellites, because the respective lines of sight between the satellites 18 and the receiver 10 are blocked by buildings 12 and/or 14.

As mentioned in the introduction, the knowledge that satellites 18 are NLOS satellites and/or that satellite 20 is an LOS satellite, may be used to improve the accuracy of the position calculation by receiver 10, for example as described in U.S. Patent Application Publication No. 2010/0079332 and in PCT patent application PCT/IB2011/055899 of the Inventor.

Methods for identifying whether satellites are LOS satellites or NLOS satellites, which may be used to improve the accuracy of a position calculating by receiver 10, according to the teachings herein are described hereinbelow with reference to FIGS. 2, 3A, 3B and 4A to 4D.

Figure 2:
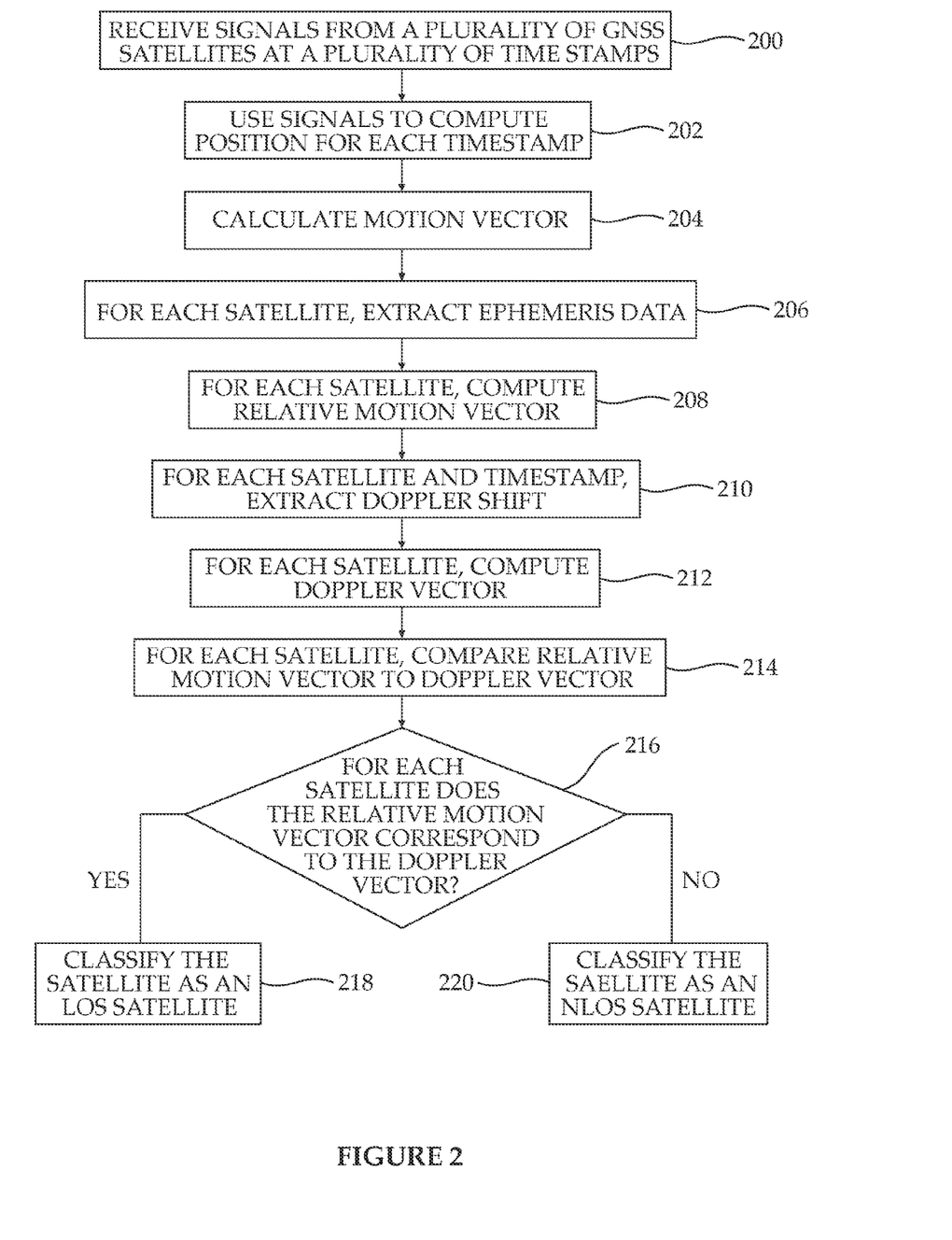
FIG. 2 is a flow chart of an embodiment of a method for identifying whether a GNSS satellite is an LOS satellite or an NLOS satellite with respect to a GNSS receiver using the Doppler effect according to an embodiment of the teachings herein.

Reference is now made to FIG. 2, a flow chart of an embodiment of a method for identifying whether a satellite is an LOS satellite or an NLOS satellite with respect to a GNSS receiver using the Doppler effect according to an embodiment of the teachings herein.

According to an aspect of some embodiments of the invention there are provided methods for classifying whether or not a GNSS satellite has a line of sight to a GNSS receiver, comprising:

at at least two timestamps, receiving signals from a GNSS satellite;

using the received signals, and ephemeris data of the GNSS satellite, to compute a relative direction vector indicating a direction of motion of a GNSS receiver relative to the GNSS satellite;

computing a Doppler vector indicating the direction of motion of the GNSS receiver relative to the GNSS satellite, based on Doppler shifts computed for each of the received signals; and comparing the relative direction vector and the Doppler vector; and using the comparison to classify whether:

the GNSS satellite is an LOS satellite having a line of sight to the GNSS receiver; or the GNSS satellite is an NLOS satellite, not having a line of sight to the GNSS receiver.

According to an aspect of some embodiments of the invention there are also provided devices for classifying whether or not a GNSS satellite has a line of sight to a GNSS receiver, comprising:

a receiver configured to receive data representing signals from a GNSS satellite at at least two timestamps;

a relative motion computing module configured to use the received signals, and ephemeris data of the GNSS satellite, to compute a relative direction vector indicating a direction of motion of a mobile receiver relative to the GNSS satellite;

a Doppler computing module configured to compute a Doppler vector indicating the direction of motion of the mobile receiver relative to the GNSS satellite, based on Doppler shifts computed for each of the received signals; and a satellite classification module configured to compare the relative direction vector and the Doppler vector and to use the comparison to classify whether:

the GNSS satellite is an LOS satellite having a line of sight to the GNSS receiver; or the GNSS satellite is an NLOS satellite, not having a line of sight to the GNSS receiver.

As seen in FIG. 2, a receiver, which may be a GNSS receiver such as GNSS receiver 10 of FIG. 1, receives signals from a plurality of satellites, at least two timestamps during motion, reference numeral 200. The GNSS receiver computes its position at each of the timestamps based on the received signals, reference numeral 202. Subsequently, the GNSS receiver uses the position computations to calculate a motion vector, indicating the direction in which the GNSS receiver is moving, reference numeral 204.

The ephemeris data for each of the plurality of satellites from which signals were captured is extracted from a suitable database, reference numeral 206. In some embodiments, the ephemeris data is extracted for each of the timestamps for which signals were received. It is appreciated that the extraction of ephemeris data for the satellite and the computing the vector of motion of the GNSS receiver can be carried out serially or concurrently.

In reference numeral 208, the GNSS receiver uses the motion vector computed at reference numeral 204 and the extracted ephemeris data of each of the satellites from which signals were received, to define, for each satellite, a relative motion vector indicating the GNSS receiver's direction of motion with respect to that satellite. In other words, for each satellite, the GNSS receiver identifies whether it is moving towards the satellite, or away from the satellite.

Additionally, for each satellite and for each timestamp, the GNSS receiver calculates the value for the Doppler shift, reference numeral 210, and for each of the satellites, the GNSS receiver combines the Doppler shifts calculated at each timestamp to compute a Doppler vector, indicating the direction in which the GNSS receiver is moving relative to the satellite, reference numeral 212. In reference numeral 214, in order to classify a satellite as an LOS satellite or as an NLOS satellite, for each of the plurality of satellites, the direction indicated by the Doppler vector computed at reference numeral 212 is compared to the direction indicated by the relative motion vector computed at reference numeral 208.

For each satellite, if the direction indicated by the Doppler vector corresponds to the direction indicated by the relative motion vector, for example, both indicate that the satellite and receiver are moving closer together or both indicate the satellite and receiver are moving apart from each other, reference numeral 216, the GNSS receiver classifies the satellite as an LOS satellite, reference numeral 218. Otherwise, when one of the Doppler and relative motion vectors indicates that the satellite and receiver are moving closer together and the other indicates that the satellite and receiver are moving apart from each other, the GNSS receiver classifies the satellite as an NLOS satellite, reference numeral 220.

It is appreciated that in some embodiments, a GNSS receiver receives the signals from the GNSS satellite, and transmits the received data to a receiver located at a remote server, such that some or all of the computations, including computation of the motion vector, the Doppler vector, and comparison thereof, are carried out at the remote server.

In some embodiments, the data for the received signals is not transmitted from the GNSS receiver, and some or all of the computations, including computation of the motion vector, the Doppler vector, and comparison thereof, are carried out at the GNSS receiver.

Figure 3A:
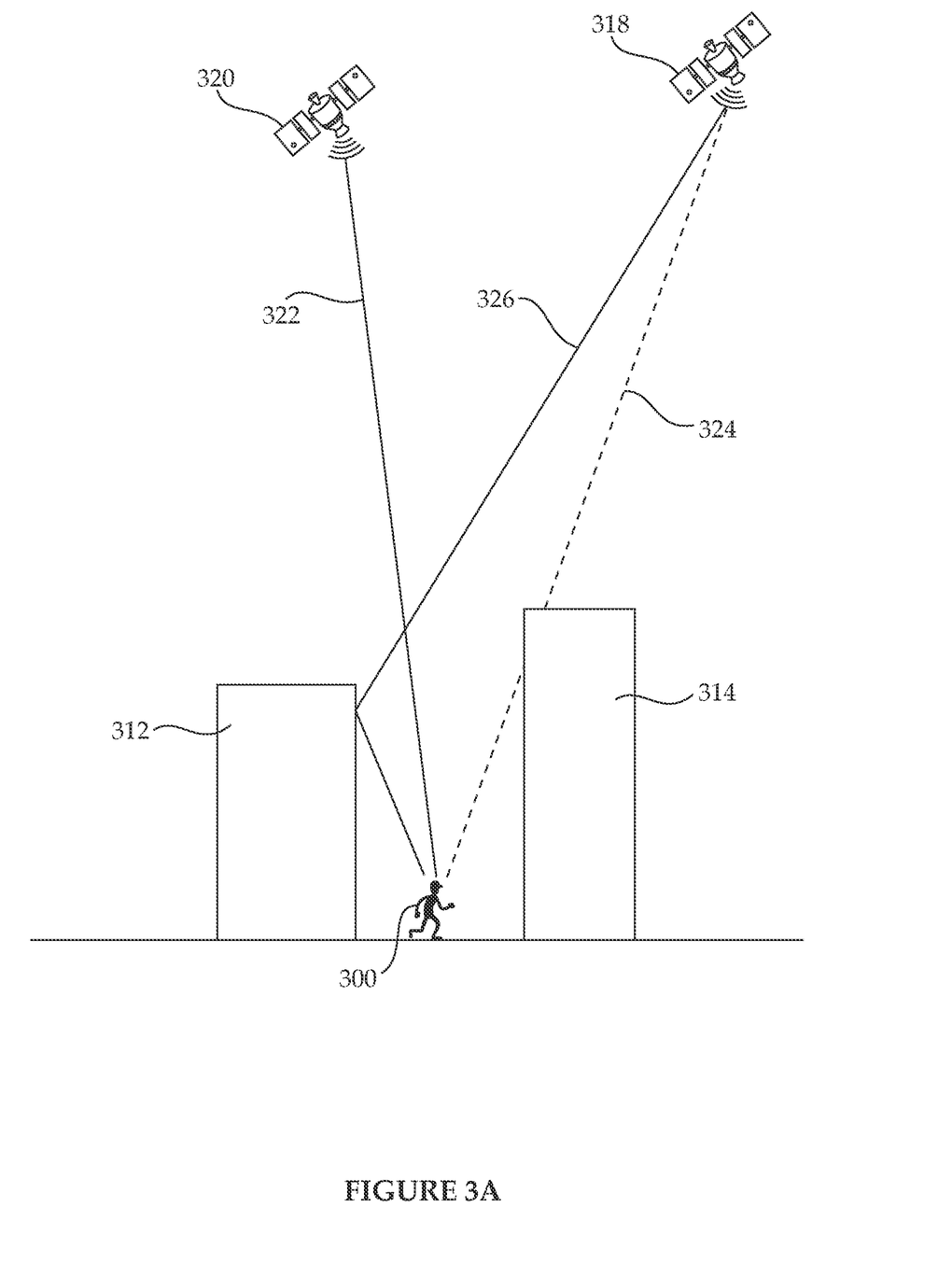
FIG. 3A is a schematic pictorial illustration of an embodiment of a device for identifying whether a GNSS satellite is an LOS satellite or an NLOS satellite with respect to a GNSS receiver using pseudoranges according to the teachings herein.
Figure 3B:
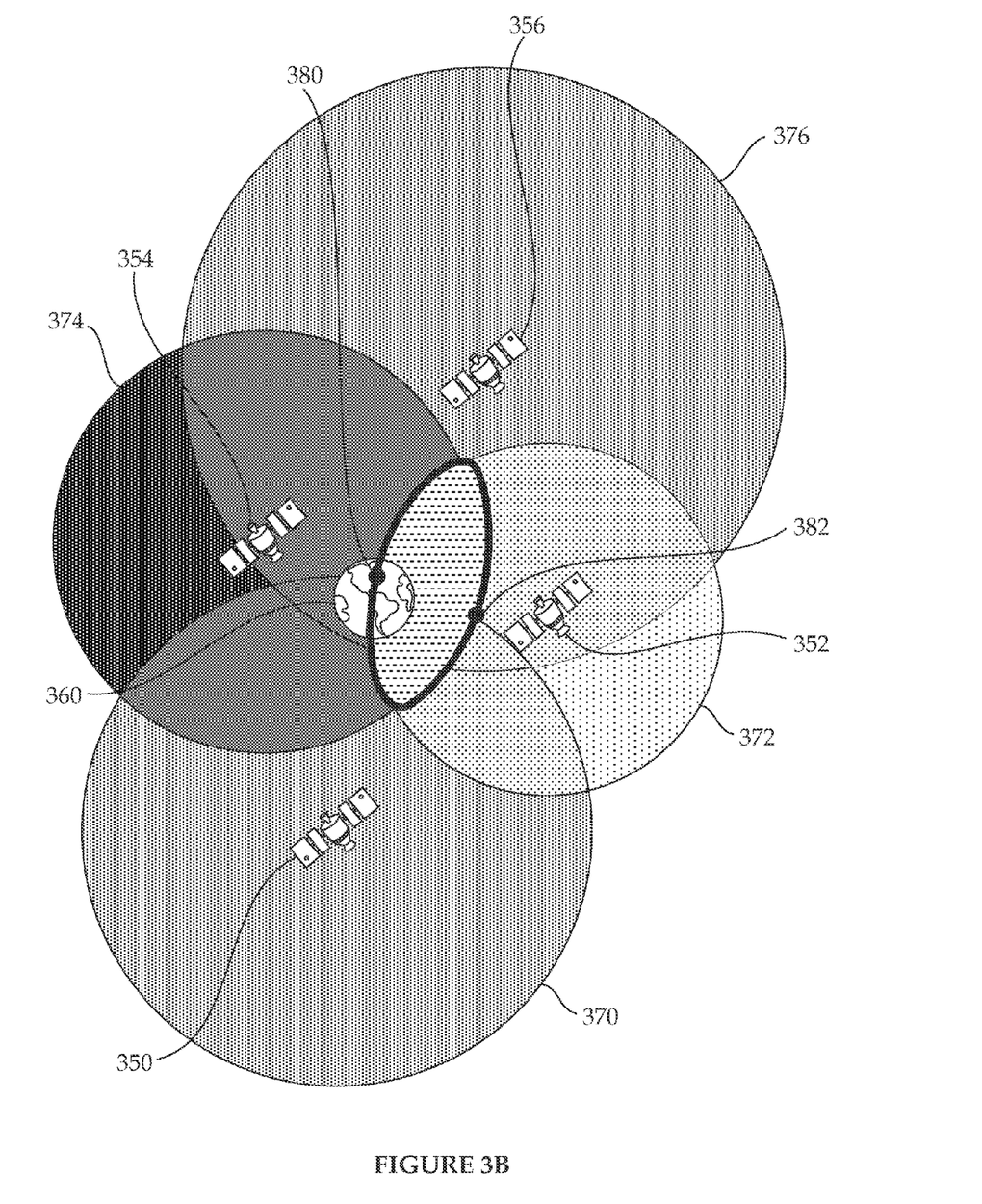
FIG. 3B is a schematic pictorial illustration of an embodiment of GNSS satellite trilateration demonstrating pseudoranges for LOS and for NLOS satellites according to the teachings herein.

Reference is now made to FIG. 3A, which is a schematic pictorial illustration of an embodiment of a device for identifying whether a GNSS satellite is an LOS satellite or an NLOS satellite with respect to a GNSS receiver using pseudoranges according to the teachings herein, and to FIG. 3B, which is a schematic pictorial illustration of an embodiment of GNSS satellite trilateration demonstrating pseudoranges for LOS and for NLOS satellites according to the teachings herein.

As seen in FIG. 3A, a user 300 holding a GNSS receiver (not shown) is located in an urban area between two tall buildings, indicated by reference numerals 312 and 314. GNSS satellites, indicated by reference numerals 318 and 320 are above the horizon, and therefore in a visible range, with respect to the GNSS receiver held by user 300.

As seen, satellite 320 is an LOS satellite, having an unblocked line of sight 322 to the GNSS receiver held by user 300. Satellite 318 is an NLOS satellite, because the line of sight 324 between satellite 318 and the receiver held by the user 300 is blocked by building 314. That said, the GNSS receiver held by user 300 indirectly receives a signal from satellite 318, via a reflection off the surface of building 312, as indicated by reference numeral 326. However, the path 326 that the reflected signal takes from satellite 318 to the receiver is longer than the direct path 324 between satellite 318 and the receiver held by user 300, as is clearly evident from geometric consideration of paths 324 and 326.

Turning to FIG. 3B, it is seen that four satellites 350, 352, 354, and 356 are in orbit around the Earth 360, and are transmitting signals receivable by a GNSS receiver (not shown) located on Earth 360. For each of the satellites 350, 352, 354, and 356, a pseudorange of the distance between the satellite and the GNSS receiver is computed by the GNSS receiver based on the path length of a signal from the satellite to the GNSS receiver. Each such pseudorange is used to compute a pseudorange sphere having the pseudorange as its radius, such that the GNSS receiver must be located at some point on the surface of each sphere. As seen, a pseudorange sphere 370 is computed around satellite 350, a pseudorange sphere 372 is computed around satellite 352, a pseudorange sphere 374 is computed around satellite 354, and a pseudorange sphere 376 is computed around satellite 356.

In FIG. 3B it is seen that pseudorange spheres 370, 372, and 374 have two intersection point 380 and 382, where point 380 is located on the surface of Earth 360 and point 382 is located in outer space. Thus, according to standard prior-art GNSS location computation practices, the GNSS receiver on Earth 360 would compute its own location to be at the intersection of the pseudorange spheres which also intersects with Earth, namely point 380.

Additionally, pseudorange sphere 376 does not intersect with the other pseudorange spheres at either of points 380 and 382, and encompasses Earth 360 rather than having an intersection point with the surface of Earth. From this one can conclude that the radius of pseudorange sphere 376, which is in fact the pseudorange corresponding to satellite 356, is longer than expected. Such a longer pseudorange typically results from an extended path length between a satellite and a GNSS receiver, such as that of path 326 in FIG. 3A, which extended path length is typically due to an NLOS path, including reflections, between the receiver and the satellite. As a result, the fact that pseudorange sphere 376 does not intersect with the other pseudorange spheres and encompasses Earth 360 and/or intersection point 380 can be used to identify the corresponding satellite 356 as an NLOS satellite, as explained in further detail hereinbelow with reference to FIGS. 4A-4D.

Figure 4A:
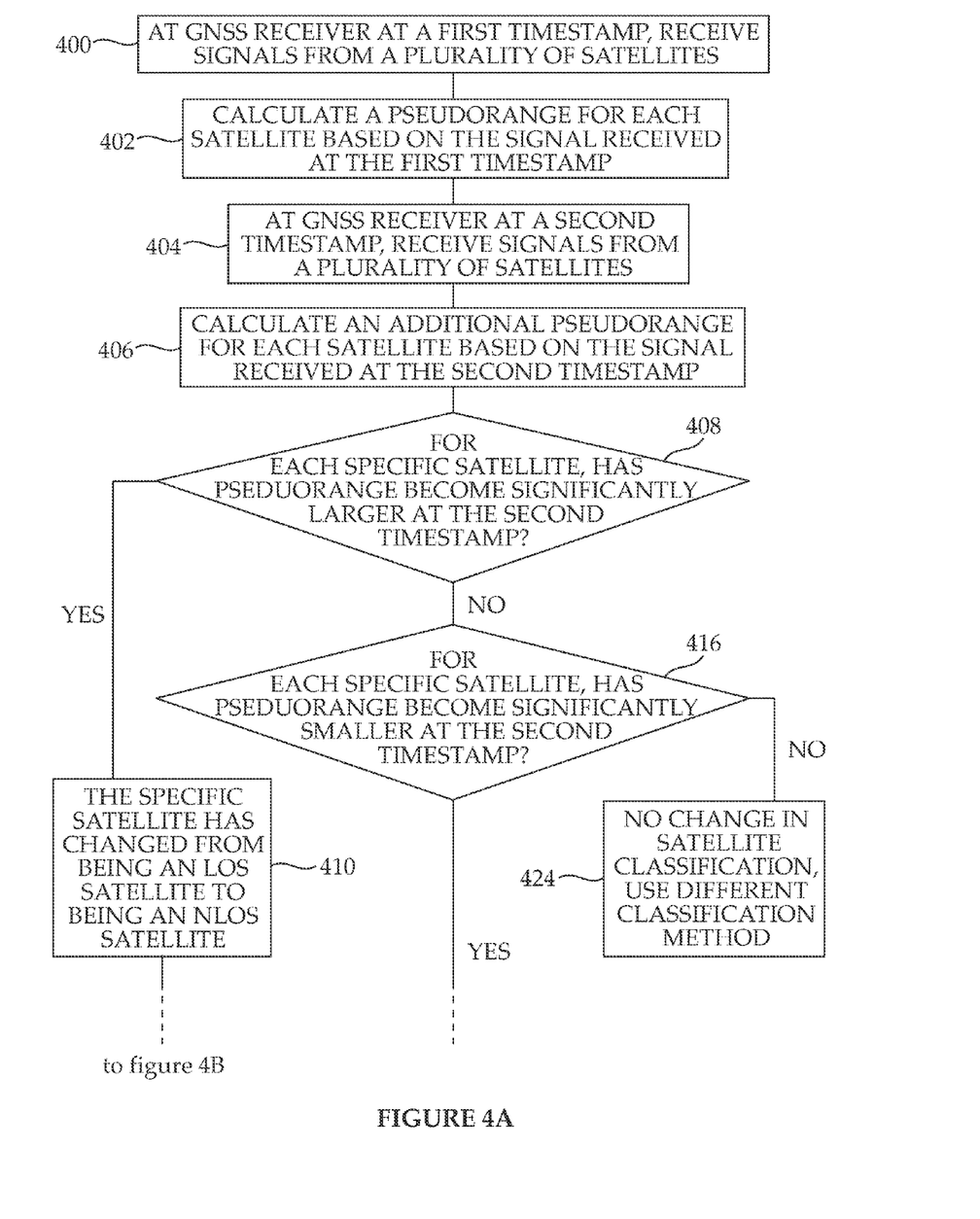
FIGS. 4A and 4B, taken together, are a flow chart of an embodiment of a method for identifying whether a GNSS satellite is an LOS satellite or an NLOS satellite with respect to a GNSS receiver using pseudoranges according to an embodiment of the teachings herein.
Figure 4B:
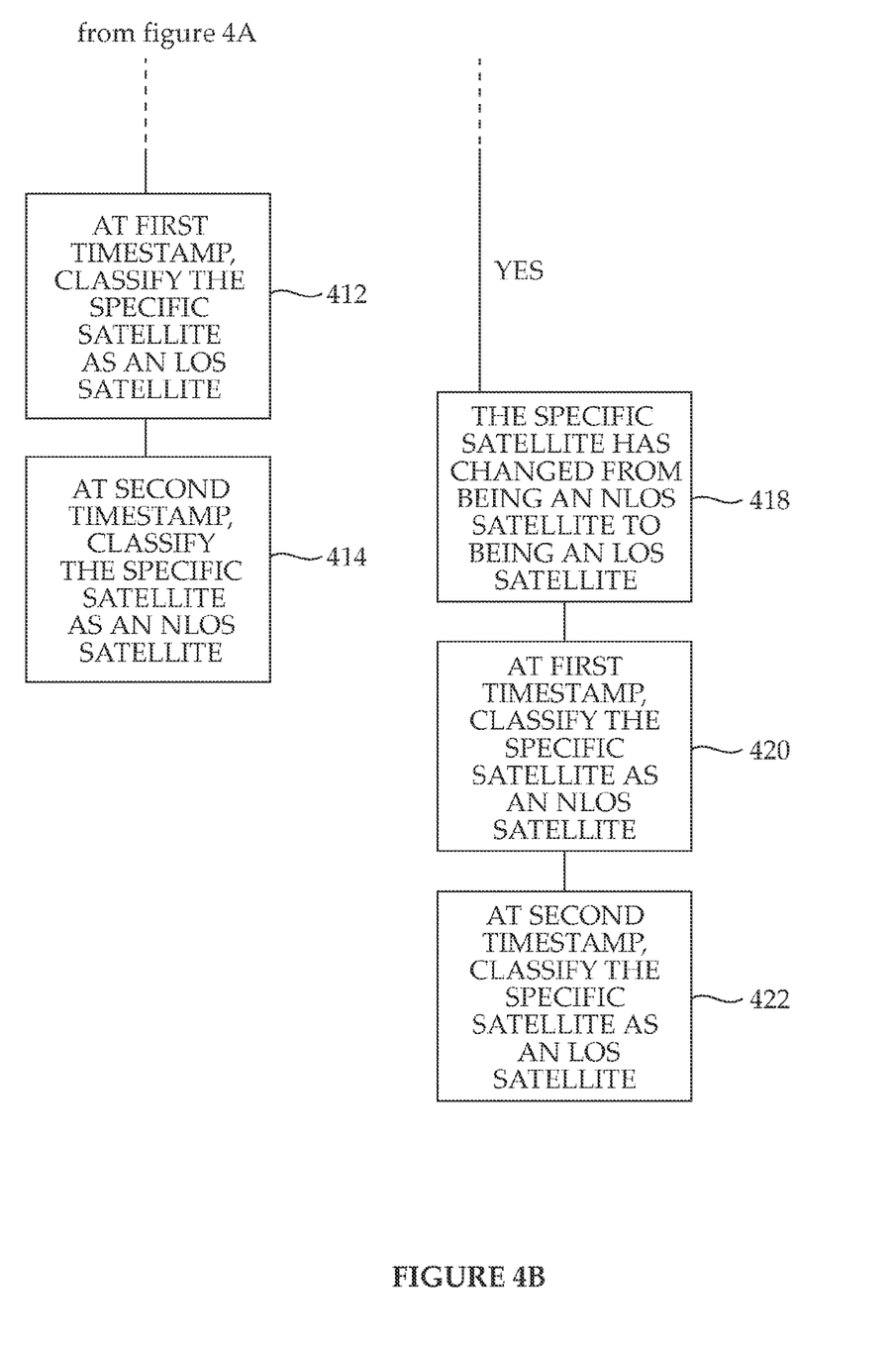
Figure 4C:
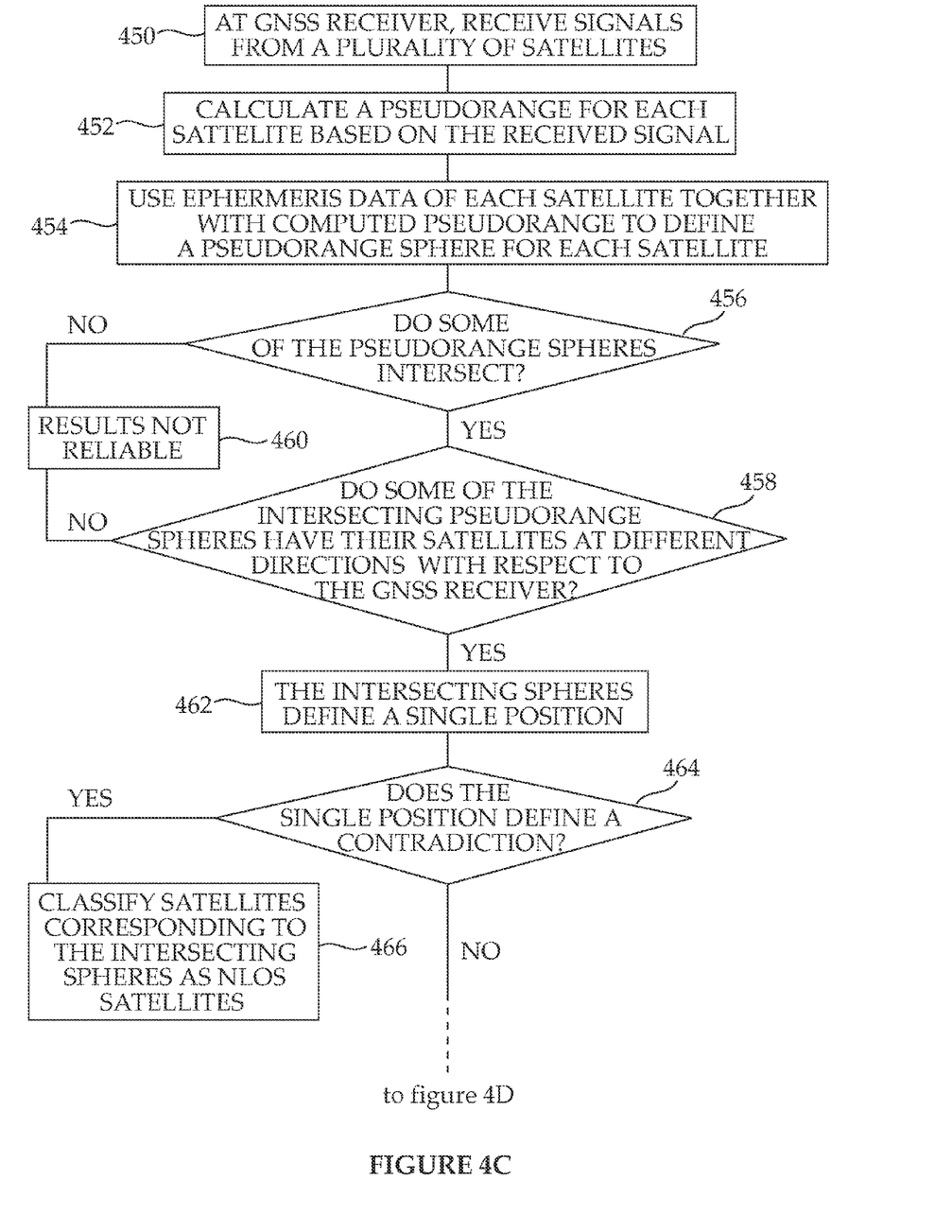
FIGS. 4C and 4D, taken together, are a flow chart of another embodiment of a method for identifying whether a GNSS satellite is an LOS satellite or an NLOS satellite with respect to a GNSS receiver using pseudoranges according to an embodiment of the teachings herein.
Figure 4D:
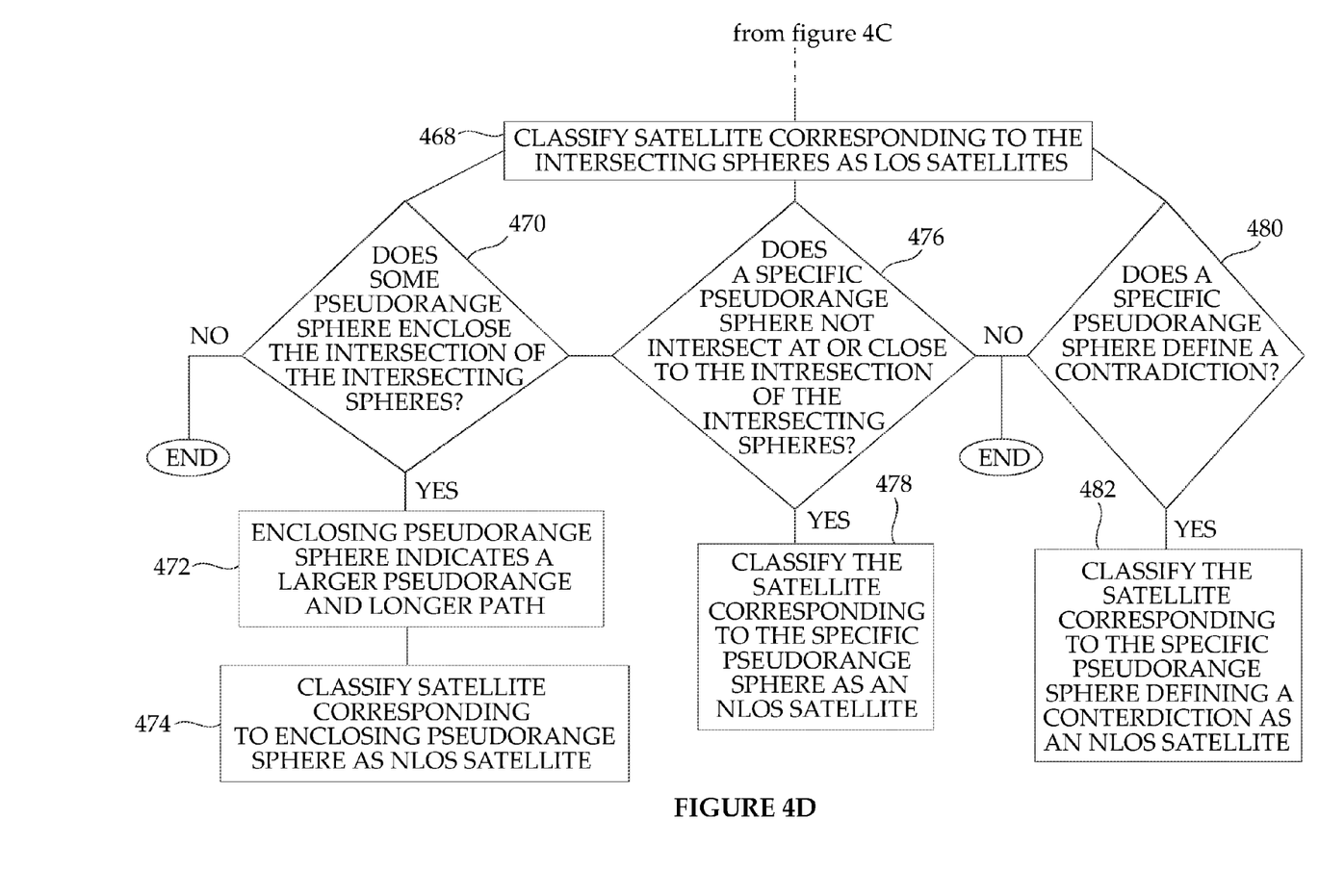

Reference is now made to FIGS. 4A and 4B, which, when taken together, are a flow chart of an embodiment of a method for identifying whether a GNSS satellite is an LOS satellite or an NLOS satellite with respect to a GNSS receiver using pseudoranges according to an embodiment of the teachings herein, and to FIGS. 4C and 4D, which, when taken together, are a flow chart of another embodiment of a method for identifying whether a GNSS satellite is an LOS satellite or an NLOS satellite with respect to a GNSS receiver using pseudoranges according to an embodiment of the teachings herein. According to an aspect of some embodiments of the invention there are also provided methods for classifying whether or not multiple GNSS satellites have a line of sight to a GNSS receiver, comprising:

receiving signals from a plurality of GNSS satellites;

for each satellite in the plurality of GNSS satellites, computing a pseudorange to the GNSS receiver based on at least one signal received from that satellite; and using the computed pseudoranges to classify, for each satellite in the plurality of GNSS satellites, whether:

the satellite is an LOS satellite, having a line of sight to the GNSS receiver; or the satellite is an NLOS satellite, not having a line of sight to the GNSS receiver.

According to an aspect of some embodiments of the invention there are also provided devices for classifying whether or not multiple GNSS satellites have a line of sight to a GNSS receiver, comprising:

a receiver configured to receive signals from a plurality of GNSS satellites;

a pseudorange computing module configured, for each satellite in the plurality of GNSS satellites, to compute a pseudorange to the GNSS receiver based on at least one of the signals received from the satellite; and a satellite classifying module configured to use the computed pseudoranges to classify, for each satellite in the plurality of GNSS satellites, whether:

the satellite is an LOS satellite, having a line of sight to the GNSS receiver; or the satellite is an NLOS satellite, not having a line of sight to the GNSS receiver.

In accordance with some such embodiments, a GNSS receiver, such as GNSS receiver 10 of FIG. 1, receives signals from a plurality of satellites and calculates a pseudorange to each of these satellites. The calculation of the pseudoranges may be carried out using any suitable method, for example as known in the art.

Subsequently, the pseudoranges are assessed using at least one test, as described hereinbelow, in order to classify the satellites as LOS satellites or as NLOS satellites.

Turning to FIGS. 4A and 4B, the GNSS receiver receives signals from a plurality of satellites at a first timestamp, reference numeral 400, and calculates a pseudorange for each of the satellites based on the signal received at the first timestamp, reference numeral 402. Subsequently, the GNSS receiver receives signals from the plurality of satellites at a second timestamp, reference numeral 404, and calculates a second pseudorange for each of the satellites based on the signal received at the second timestamp, reference numeral 406.

In some embodiments, succeeding calculated pseudorange values are monitored for a sudden change indicating a satellite changing from being an LOS to an NLOS satellite or vice versa.

At reference numeral 408, if at the second timestamp the pseudorange for a specific satellite has suddenly become unexpectedly larger (increases) than the pseudorange computed at the first timestamp, it is concluded that the satellite changing from being an LOS satellite to being an NLOS satellite, reference numeral 410. Thus, the satellite is classified as an LOS satellite at the first timestamp, as seen at reference numeral 412 in FIG. 4B, and at the second timestamp the satellite is classified as an NLOS satellite, reference numeral 414.

Similarly, if, at one of the timestamps, the calculated pseudorange suddenly becomes unexpectedly larger (increases) than at a preceding timestamp, it is concluded that the satellite corresponding to the pseudorange has changed from being an LOS satellite, where the path of the signal from the satellite to the receiver was direct, to being an NLOS satellite, where the path of the signal from the satellite to the receiver included at least one reflection and is consequently longer. In some such embodiments, the satellite is classified as an LOS satellite until such a sudden increase in the pseudorange leads to reclassification of the satellite as an NLOS satellite.

It is appreciated that in some such embodiments, the change in succeeding calculated pseudorange is an increase by several meters over a short period of time, and such a change is considered a clear indication of passing from the satellite being an LOS satellite to being an NLOS satellite.

It is appreciated that the exact value or extent of the change in pseudorange magnitude indicative of a change in GNSS satellite classification is application dependent, that is, would be different if the GNSS receiver is expected to be moving no faster than 5 km/h (e.g., walking), 30 km/h (e.g., bicycling) or at 200 km/h (e.g., vehicle). A change in magnitude indicative of a change in GNSS satellite classification would be clearly evident to a person of skill in the art.

Returning to reference numeral 408, if at the second timestamp the pseudorange for a specific satellite has not become significantly larger (increases) than the pseudorange computed at the first timestamp, the method proceeds to test for a significant decrease in the computed pseudorange. At reference numeral 416, if at the second timestamp the pseudorange for a specific satellite has suddenly become significantly smaller (decreases) than the pseudorange computed at the first timestamp, it is concluded that the satellite changing from being an NLOS satellite to being an LOS satellite, reference numeral 418 in FIG. 4B. Thus, the satellite is classified as an NLOS satellite at the first timestamp, as seen at reference numeral 420, and at the second timestamp the satellite is classified as an NLOS satellite, reference numeral 422.

Similarly, if, at one of the timestamps, the calculated pseudorange suddenly becomes significantly smaller (decreases) than at previous timestamps, it is concluded that the satellite corresponding to the pseudorange has changed from being an NLOS satellite where the path of the signal from the satellite to the receiver included at least one reflection to being an LOS satellite where the path of the signal from the satellite to the receiver is direct. In some such embodiments, the pseudoranges of a satellite classified as an NLOS satellite are monitored and such a sudden decrease in the pseudorange leads to reclassification of the satellite as an LOS satellite.

That said, it is appreciated that this type of transition is potentially ambiguous, mainly because the path the signal takes from the satellite to the GNSS receiver can be shorter and yet the satellite remains an NLOS satellite, for example if the reflections define a shorter path. Thus, according to some embodiments of the teachings herein, a sudden decrease in the pseudorange is not sufficient in and of itself to change the classification of the corresponding satellite from an NLOS satellite to an LOS satellite. In some embodiments, a three-dimensional representation, such as a map, of the area in which the GNSS receiver is located is used to estimate the path that the signal traverses from the satellite to the GNSS receiver. In some such embodiments, a decrease in the pseudorange, which can be shown, with reference to the three dimensional representation to be caused by a satellite changing from being an NLOS to an LOS satellite, is used for reclassifying the satellite as an LOS satellite following a sudden decrease in the pseudorange.

Returning to reference numeral 416, if there has been no significant decrease in the pseudorange at the second timestamp, and there was no significant increase in the pseudorange in reference numeral 408, it is concluded that there has been no change in satellite classification and that a different classification method should be used, reference numeral 424.

Turning to FIGS. 4C and 4D, it is well known in the art to view each pseudorange as the radius of a sphere, having its center at the GNSS satellite. This concept is at the basis of the method of FIGS. 4C and 4D, described hereinbelow.

At reference numeral 450, a GNSS receiver, such as GNSS receiver 10 of FIG. 1, receives signals from a plurality of satellites, and calculates a pseudorange for each of the satellites based on the received signal, reference numeral 452.

At reference numeral 454, the computed pseudorange for each GNSS satellite from which a signal was received, together with the ephemeris data of the GNSS satellite, are used to define a pseudorange sphere for the satellite. In order to determine whether the satellite is an LOS satellite or an NLOS satellite, additional tests are applied to the pseudorange spheres as described hereinbelow.

At reference numeral 456, the pseudorange spheres are checked to see whether at least some of them intersect at a single point, for example using trilateration. It is appreciated that in the context of the present application, intersection at a single point would be considered any situation in which all of the pseudorange spheres have a point falling within an error circle of a predetermined radius, e.g. 5 meters, as clearly understood by one of skill in the art.

If some of the pseudorange spheres intersect, the intersecting pseudorange spheres are tested to determine whether the satellites at their centers are located at different directions with respect to the GNSS receiver, when trilateration is used, reference numeral 458. If none of the pseudorange spheres intersect or if all the satellites at the centers of the intersecting spheres are located in the same direction with respect to the GNSS receiver, the intersection test results are unreliable, reference numeral 460, and a different method should be used to identify whether or not the GNSS satellite has a line of sight to the GNSS receiver.

Otherwise, if some of the spheres intersect, and the satellites corresponding to the intersecting spheres are located at different directions relative to the GNSS receiver, the intersecting pseudorange spheres define a single position, reference numeral 462. In some embodiments, the GNSS receiver uses trilateration using some or all of the signals it receives to estimate its position. In some such embodiments, all pseudorange spheres are expected to intersect at, or at least close to, the estimated position.

At reference numeral 464, the single position is tested to determine whether or not it defines a contradiction. Specifically, sometimes, there exists a contradiction between the location in which the signal from a satellite is expected to arrive, and the locations in which the pseudorange sphere intersection actually indicates that the signal could arrive. In some such embodiments, a contradiction occurs when a pseudorange sphere indicates that the location of the GNSS receiver is below the surface of the earth (e.g., underground or submerged in a body of water). In some embodiments, a contradiction occurs when a pseudorange sphere indicates that the GNSS receiver is located far above ground, where it would be unlikely for a GNSS receiver to be located, for example in outer space. In some embodiments, a contradiction occurs when a pseudorange sphere indicates that the GNSS receiver is located deep under the surface of a body of water. If a contradiction exists, it is likely that the intersecting spheres correspond to satellites having an extended path to the GNSS receiver, or to NLOS satellites. Thus, at reference numeral 466, the satellites corresponding to the intersecting pseudorange spheres are classified as NLOS satellites.

Turning to FIG. 4D, if the intersection point does not define a contradiction, satellites corresponding to the intersecting spheres are classified as LOS satellites, reference numeral 468.

In some embodiments, shown at reference numeral 470, non-intersecting pseudorange spheres are checked to see whether they enclose the point of intersection of the intersecting spheres. If a pseudorange sphere encloses the intersection of the intersecting pseudorange spheres, this is indicative of a larger pseudorange and a longer path from the respective satellite to the GNSS receiver, thereby indicating that there is no line of sight between the respective satellite and the GNSS receiver, reference numeral 472. Thus, the satellite corresponding to the pseudorange sphere that enclose the intersection of the intersecting pseudorange spheres are classified as an NLOS satellite, reference numeral 474.

In some embodiments, shown at reference numeral 476, if a pseudorange sphere of a specific satellite does not intersect at, or at least close to, the expected region, or the intersection point of the intersecting spheres, that specific satellite is classified as an NLOS satellite, reference numeral 478.

As seen at reference numeral 480, if it is determined that a specific pseudorange sphere defines a contradiction as described above, the corresponding satellite is classified as an NLOS satellite, reference numeral 482.

It is appreciated that in some embodiments, classifying satellites as LOS satellites and NLOS satellites based on pseudoranges and pseudorange spheres as described hereinabove is particularly useful when the GNSS receiver is static.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:
1. A method for classifying whether or not a GNSS satellite has a line of sight to a GNSS receiver, the method comprising:
at at least two timestamps, at a GNSS receiver, receiving signals from a GNSS satellite;
using said received signals and ephemeris data of said GNSS satellite, computing a relative direction vector indicating a direction of motion of said GNSS receiver relative to said GNSS satellite;

computing a Doppler vector indicating the direction of motion of said GNSS receiver relative to said GNSS satellite, based on Doppler shifts computed for each of said received signals;

comparing said relative direction vector and said Doppler vector; and using said comparison, classifying whether:
said GNSS satellite is an LOS satellite having a line of sight to said GNSS receiver; or
said GNSS satellite is an NLOS satellite, not having a line of sight to said GNSS receiver.

2. The method of claim 1, wherein said comparing comprises comparing a direction of said relative direction vector and a direction of said Doppler vector.

3. The method of claim 2, wherein said classifying comprises classifying said GNSS satellite as an LOS satellite if said direction of said relative direction vector corresponds to said direction of said Doppler vector.

4. The method of claim 2, wherein said classifying comprises classifying said GNSS satellite as an NLOS satellite if said direction of said relative direction vector does not correspond to said direction of said Doppler vector.

5. The method of claim 1, also comprising extracting said ephemeris data from a database.

6. The method of claim 5, wherein said extracting comprises extracting said ephemeris data from said database at an extracting rate.

7. The method of claim 1, and also comprising:
obtaining ephemeris data of said GNSS satellite at each of said at least two timestamps;
using said ephemeris data taken at each of said at least two timestamps to compute a satellite vector indicative of a direction of motion of said GNSS satellite, and
wherein said comparing comprises comparing said relative direction vector and said Doppler vector while taking into consideration said direction of motion of said GNSS satellite as indicated by said satellite vector.

8. The method of claim 1, wherein said computing said relative direction vector comprises computing a position of said GNSS receiver at said at least two timestamps.

9. The method of claim 1, wherein at least one of said computing a relative direction vector, said computing a Doppler vector, said comparing, and said classifying is carried out at a server remote from said GNSS receiver.

10. A device for classifying whether or not a GNSS satellite has a line of sight to a GNSS receiver, comprising:
a receiver configured to receive data regarding signals from a GNSS satellite at at least two timestamps;
a relative motion computing module configured to use said received data and ephemeris data of said GNSS satellite, to compute a relative direction vector indicating a direction of motion of a mobile receiver relative to said GNSS satellite;
a Doppler computing module configured to compute a Doppler vector indicating the direction of motion of said mobile receiver relative to said GNSS satellite, based on Doppler shifts computed for each of said signals for which data was received; and
a satellite classification module configured to compare said relative direction vector and said Doppler vector and to use said comparison to classify whether:
said GNSS satellite is an LOS satellite having a line of sight to said mobile receiver; or
said GNSS satellite is an NLOS satellite, not having a line of sight to said mobile receiver.

11. The device of claim 10, wherein said satellite classification module is configured to compare a direction of said relative direction vector and a direction of said Doppler vector.

12. The device of claim 11, wherein said satellite classification module is configured to classify said GNSS satellite as an LOS satellite if said direction of said relative direction vector corresponds to said direction of said Doppler vector.

13. The device of claim 11, wherein said satellite classification module is configured to classify said GNSS satellite as an NLOS satellite if said direction of said relative direction vector does not correspond to said direction of said Doppler vector.

14. The device of claim 10, also comprising a data extractor configured to extract said ephemeris data from a database.

15. The device of claim 14, wherein said data extractor is configured to extract said ephemeris data from said database at an extracting rate.

16. The device of claim 10, and also comprising:
a satellite vector computing module configured to obtain ephemeris data of said GNSS satellite at each of said at least two timestamps and use said obtained ephemeris data to compute a satellite vector indicative of a direction of motion of said GNSS satellite,
wherein said satellite classification module is configured to compare said relative direction vector and said Doppler vector while taking into consideration said direction of motion of said GNSS satellite as indicated by said satellite vector.

17. The device of claim 10, wherein said a relative motion computing module is configured to compute a position of said mobile receiver at said at least two timestamps.

18. The device of claim 10, wherein at least one of said receiver, said relative motion computing module, said Doppler computing module, and said satellite classification module forms part of a server located remotely from said GNSS receiver.

19. The device of claim 18, wherein said receiver forms part of said server, and said data is transmitted to said receiver from a GNSS receiver functionally associated therewith.

20. The device of claim 10, wherein said receiver comprises a GNSS receiver, said mobile receiver comprises said GNSS receiver, and at least one of said relative motion computing module, said Doppler computing module, and said satellite classification module is included in said GNSS receiver.

* * * * *